United States Patent [19]

Meekins et al.

[11] Patent Number: 4,578,804
[45] Date of Patent: Mar. 25, 1986

[54] POLYNOMIAL GRATING

[75] Inventors: John F. Meekins, Springfield; Herbert Gursky, McLean, both of Va.

[73] Assignee: The United States of America as represented by the Secretary of the Navy, Washington, D.C.

[21] Appl. No.: 615,504

[22] Filed: May 30, 1984

[51] Int. Cl.⁴ .............................................. G21K 1/06
[52] U.S. Cl. ...................................... 378/84; 378/145
[58] Field of Search ...................... 378/82, 83, 84, 85, 378/145; 350/162.21

[56] References Cited

U.S. PATENT DOCUMENTS

| | | |
|---|---|---|
| 3,079,501 | 2/1963 | Birks ..................................... 378/84 |
| 3,507,564 | 4/1970 | Franks . |
| 3,577,159 | 5/1971 | Sawada ................................. 378/83 |
| 3,578,845 | 5/1971 | Brooks . |
| 3,628,849 | 12/1971 | Flamand . |
| 3,930,728 | 1/1976 | Pieuchard . |
| 3,973,850 | 8/1976 | Pouey . |
| 4,063,818 | 12/1977 | Lepere . |
| 4,068,954 | 1/1978 | Da Silva . |
| 4,140,362 | 2/1979 | Tien . |

OTHER PUBLICATIONS

"Holographic Cylindrical Grating for Cosmic X-Ray and XLIV Spectroscopy in Grazing Incidence", Singh et al., Applied Physics, vol. 19, No. 19, Oct. 1, 1980, pp. 3313–3317.

Primary Examiner—Craig E. Church
Attorney, Agent, or Firm—Robert F. Beers; Sol Sheinbein; Ansel M. Schwartz

[57] ABSTRACT

An apparatus for decomposing far ultraviolet and soft X-ray radiation into its component wavelengths comprising a diffraction grating having a diffraction grating surface defined by a polynomial $Z = \Sigma Q_k X^k$ and an optimum line spacing.

4 Claims, 5 Drawing Figures

POLYNOMIAL GRATING

This invention relates to diffraction gratings. More specifically this invention relates to diffraction gratings with high resolution over a broad wavelength range in the far ultraviolet and soft X-ray band.

BACKGROUND OF THE INVENTION

Previous methods of grating production have been to rule (by either mechanical or holographic means) lines upon a preformed (ground and polished) substrate. This substrate is nearly always a section of a plane (flat), a section of a right circular cylinder, a section of a sphere, or a section of a toroid, depending on the purpose. For the case of reflection gratings, the rulings or lines placed on the substrate alternately absorb and reflect radiation incident upon the grating such that diffraction of the radiation takes place. For the case of transmission gratings, the substrate is either transparent to the radiation of interest or is removed (leaving a free-standing grid). Diffraction takes place in a manner similar to that of the reflection grating, but in this case the lines or rulings alternately absorb and transmit the radiation.

The disadvantages of the old method are a direct consequence of the limited choice of substrate shape. While a plane (or flat) grating (if suitably ruled) is ideal for diffraction of plane-wave radiation, the other grating shapes are only approximately suited to the diffraction geometries for which they are designed. Stigmatic images can now be produced at one (or at most three wavelengths) by producing the lines on the substrate by holographic means, and as long as the wavelengths of interest lie in close proximity to one of these three wavelengths, gratings produced by state-of-the-art means are usually adequate. But, for examination of spectra over a broad wavelength range, spectroscopists have had to be either content with wavelength resolutions of less than 1000, or have been forced to introduce other optical elements (mirrors and/or lenses) in the optical path in order to reduce the divergence of the incident beam. The disadvantage inherent in the latter case is that at ultraviolet (UV) and X-ray wavelengths every optical element introduced produces large attenuations of the incident radiation, sufficiently large in many cases to reduce the radiation to a point where it is immeasurable.

A diffraction grating for examination of spectra over a broad wavelength range in the UV and X-ray wavelengths is necessary to more efficiently analyze the large number of cosmic sources that are expected to emit line radiation in the soft X-ray and far ultraviolet region of the spectrum. Optically thin sources from which line spectra are expected include flare star and hot stellar coronae, supernova remnants, contact binaries, and perhaps accretion disks around compact objects. Absorption features may be observed in some stellar objects of astrophysical interest as well as in the interstellar medium. In addition, should the resolution be large enough, Doppler shifts and line broadening will also be observed.

SUMMARY OF THE INVENTION

Accordingly, one object of this invention is to provide a novel diffraction grating with maximum resolution over a wide wavelength range.

Another object of this invention is to provide a reflection or transmission diffraction grating of maximum resolution over a wide wavelength range in the UV and X-ray wavelengths.

Still another object of this invention is to provide a stationary or fixed diffraction grating of maximum resolution over a wide wavelength range in the UV and X-ray wavelengths stationary or fixed. Lack of moving parts is an obvious advantage for instruments which must be reliably operated remotely (e.g., in satellites, rockets, or high radiation environments).

Briefly, the above and other objects are realized by the polynomial grating of the present invention comprising: a fixed diffraction gratiung having a diffraction grating surface defined by a polynomial $$z = \sum_{k=0}^{n} Q_k x^k$$

and an optimum line spacing D determined by the equation $$n(\lambda_o/D)[1 + (dz/dx)^2]^{\frac{1}{2}} = d/dx \{(R_{AO} \sin \alpha_o - Z)^2 + (R_{AO} \cos \alpha_o + X)^2]^{\frac{1}{2}} + [R_{BO} \sin \beta_o - Z)^2 + (R_{BO} \cos \beta_o - X)^2]^{\frac{1}{2}}\}_n$$

the polynomial coefficients of $$z = \sum_{k=0}^{n} a_k x^k$$

are determined by minimization of $$\rho^2 = \sum_{\lambda=\lambda_1}^{\lambda_2} (\sigma\lambda/\lambda)^2$$

$\lambda_1$ and $\lambda_2$ define the lowest and highest wavelength, respectively, in the wavelength region to be analyzed, and $\sigma_\lambda$ is the root-mean-square deviation about the mean for $\lambda$. In the optimum line spacing equation for D, d/dx denotes derivative with respect to x, $\lambda_0$ is the wavelength at which a diffracted image is to be stigmatic, $R_{AO}$ and $R_{BO}$ are distances from an incident object and from the stigmatic image to the center of the grating respectively, $\alpha_0$ and $\beta_0$ are the incidence and diffraction angels, respectively, of a central ray with respect to the grating surface at its center for the wavelength $\lambda_0$, and z is a function of x, as determined in the polynomial, and in the equation for determining the optimum line spacing D.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 4:
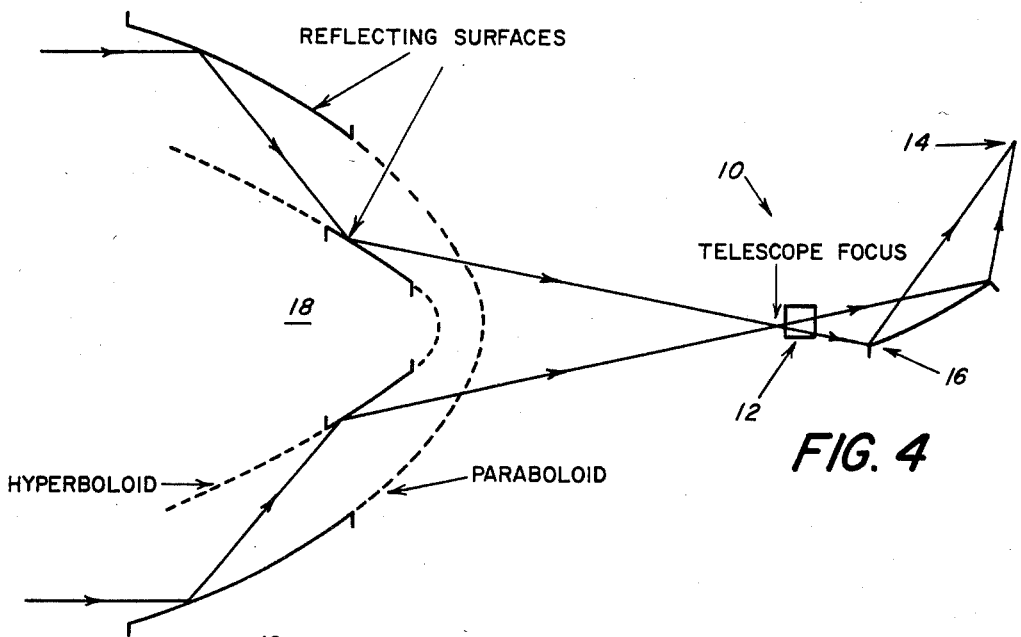
FIG. 4 is a schematic drawing of the telescope-spectrometer configuration.

Referring now to the drawings, wherein like reference numerals designate identical or corresponding parts throughout the several views, and more particularly to FIG. 4 thereof, one embodiment of a spectrometer which may be used to implement the present invention is shown. The spectrometer 10 comprises an elliptical mirror 12, which focuses the image 14 in a direction normal to the dispersion plane, a cylindrical, polynomial reflection grating 16 with an average line spacing of about 6000 lines/mm, and a detector with a curved imaging surface (not shown). The spectrometer may take a variety of configurations. By way of example, the spectrometer 10 in FIG. 4 is shown as a Wolter type II collecting mirror telescope 18, which focuses the incoming beam into the entrance slit of the spectrometer 10 containing the polynomial reflection grating 16. The configuration (FIG. 4) resembles a Rowland-circle spectrometer, but the geometry is different. The shape of the grating 16, its position, and the variation of ruling density along the grating are optimized to yield the maximum resolution, which is determined by ray tracing calculations. The Wolter type II system is chosen because of its ability to combine two desirable properties, high effective collecting area and a narrow angle of convergence of the beam upon the spectrometer entrance slit. The latter improves the resolving power of the spectrometer.

Figure 5:
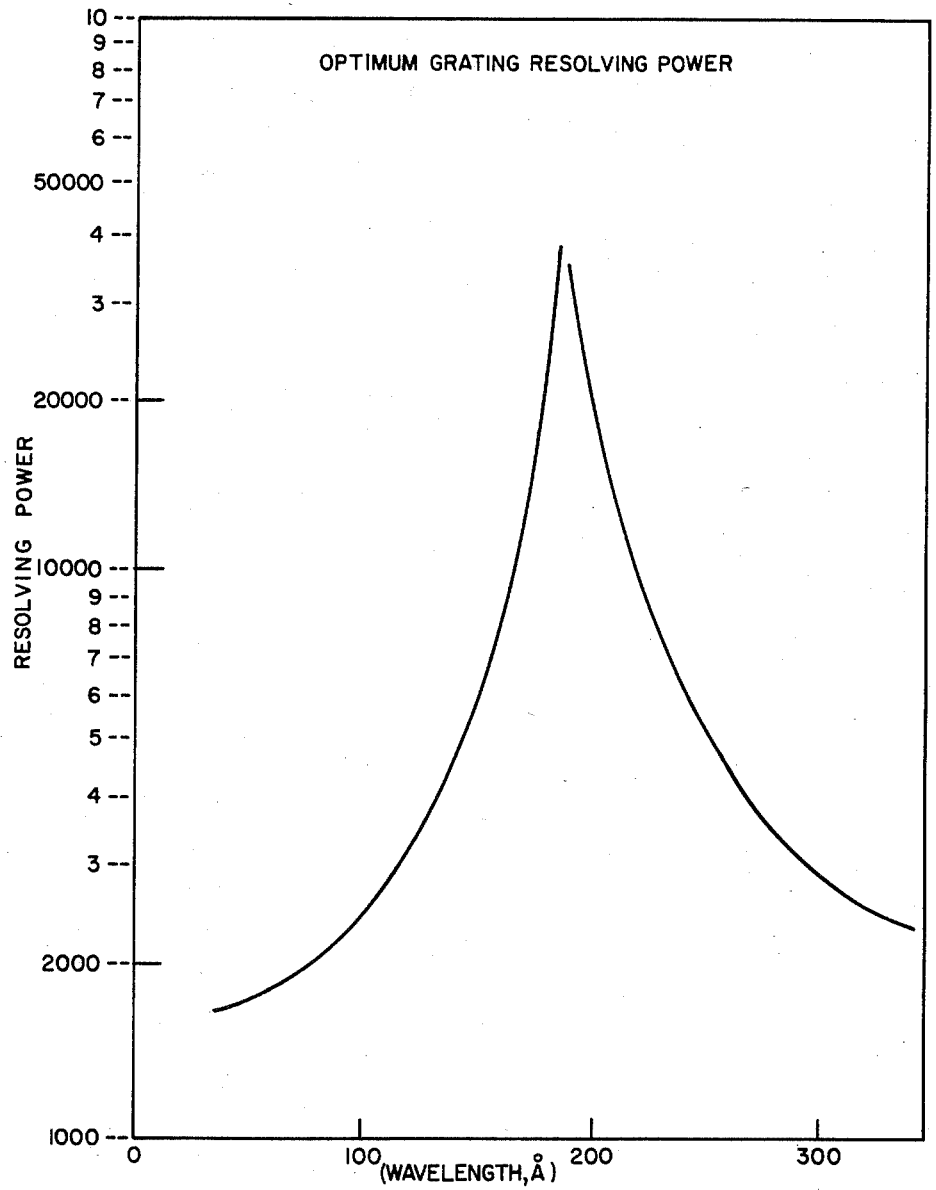
FIG. 5 is a graph detailing the resolving power of the optimum grating for a line source. The source spray angle is $\pm 3°$.

The spectrometer was optimized for operation in the 40–340 Å band and uses an angle of incidence on the grating of approximately 10°. The calculated spectral resolving power of the grating, which is greater than $10^3$ between 40 and 340 Å, is illustrated in FIG. 5. The grating, which produces a stigmatic image at about 193 Å, has a ruling density which increases from 5940 lines/mm at the end near the entrance slit to 6020 lines/mm at the other. The grating parameters for this case are presented in Table 1.

TABLE 1

Grating Parmaeters (3° line source)

| Fixed Parameters | |
|---|---|
| Line density at the origin ($D_0^{-1}$) | 6000 lines mm$^{-1}$ |
| Source positon from the origin ($R_{AO}$) | 17.365 cm |
| Angle of incidence of central ray ($\alpha_o$) | 10° |
| Source spray angle subtended by grating | $\pm 3°$ |
| Grating length | 11.5 cm |
| Optimum parameters (40Å $\leq \lambda \leq$ 340Å) | |
| Optimum wavelength for line spacing ($\lambda_0$) | 193.498Å |
| Image position from the origin at $\lambda_0$ ($R_{BO}$) | 46.8926 cm |

TABLE 1-continued

Grating Parmaeters (3° line source)

| Coefficients of polynomial grating surface | $\left( z = \sum_k a_k x^k \right)$ |
|---|---|
| $a_0$ | 0.0 cm (fixed) |
| $a_1$ | $-1.91112 \times 10^{-10}$ |
| $a_2$ | $4.95755 \times 10^{-3}$ cm$^{-1}$ |
| $a_3$ | $-1.00766 \times 10^{-6}$ cm$^{-2}$ |
| $a_4$ | $3.33658 \times 10^{-6}$ cm$^{-3}$ |
| $a_5$ | $-2.28002 \times 10^{-8}$ cm$^{-4}$ |
| $a_6$ | $1.03691 \times 10^{-9}$ cm$^{-5}$ |
| $a_7$ | $-8.783 \times 10^{-11}$ cm$^{-6}$ |
| $a_8$ | $1.954 \times 10^{-12}$ cm$^{-7}$ |
| $a_9$ | $2.934 \times 10^{-15}$ cm$^{-8}$ |
| $a_{10}$ | $5.756 \times 10^{-15}$ cm$^{-9}$ |

The cusp at about 193 occurs because the line spacing is optimum there and ray tracing methods produce an image of zero width. The image positions along the central ray for which $\sigma_\beta$ is a minimum do not lie on a Rowland circle. While for the source position $R_A/\sin \alpha_o = 100$ cm, the corresponding values for the image positions ($R_B/\sin \beta_c$, where $\beta_c$ is the diffraction angle for the central ray of wavelength $\lambda$) are less than 100 cm as shown in Table 2.

TABLE 2

Spectrometer Parameters (Line Source)

| $\lambda$ (Å) | P | $R_{AO}\sin\alpha_0$ (cm) | $R_{BO}/\sin\beta_C$ (cm) | $s_{max}$ (μm) | $t_{max}$ (μm) |
|---|---|---|---|---|---|
| 100 | 2500 | 100 | 96.6 | 24 | 61 |
| 150 | 5500 | 100 | 95.5 | 16 | 35 |
| 200 | 26000 | 100 | 94.6 | 4.6 | 8.7 |
| 250 | 5600 | 100 | 93.8 | 27 | 46 |
| 300 | 3000 | 100 | 93.1 | 60 | 94 |

Also shown are the maximum aperture-($S_{max}$) and detector spatial resolution ($t_{max}$) widths needed in order to obtain the resolving power, P, attained by the grating alone.

In order to define a grating optimized for a range of wavelengths $\lambda_1 \leq \lambda \leq \lambda_2$, both the grating surface and the grating line spacing must be determined. To that end, we first consider radiation from a line source diffracted by a cylindrical grating of unknown (as yet) cross section into an image as in FIG. 1 wherein the source is located at A with a position vector $\bar{R}_{A0}$; the centroid of the image is located at B with a position vector $\bar{R}_{B0}$. The grating surface is cylindrical with a cross section described by the vector, $\bar{R} = x\hat{e}_x + z\hat{e}_z$, where $z=z(x)$. The vectors, $\bar{R}_A = \bar{R}_{A0} - \bar{R}$ and $\bar{R}_B = \bar{R}_{B0} - \bar{R}$, are position vectors of the source and image, respectively, as seen from the point $\bar{R}$ in the grating surface.

Here, we wish to determine that grating surface and line spacing which produces maximum resolution over the desired wavelength range. In general, the diffracted rays will not converge to a line, but rather will produce a blurred image. As viewed from the origin (point at which the central ray intersects the grating surface), the blurring is equivalent to a spread in the central ray diffraction angle $\beta_c$ which in turn is related to an apparent spread in wavelength by $\eta\sigma_\lambda \approx D_0\sigma_\beta \sin\beta_c$ where $\sigma_\beta$ and $\sigma_\lambda$ are the root mean-square deviations about the mean for $\beta_c$ and $\lambda$, respectively, and $D_0$ is the grating line spacing at the origin. Since the position along the diffracted central ray at which $\sigma_\lambda$ is a minimum will not necessarily lie on the Rowland circle (all discussion refers specifically to the standard Rowland geometry, although not limited thereto) part of the spectrometer specification is the definition of the surface of minimum $\sigma_\lambda$ (or minimum $\sigma_\beta$) at each diffracted wavelength.

Figure 1:
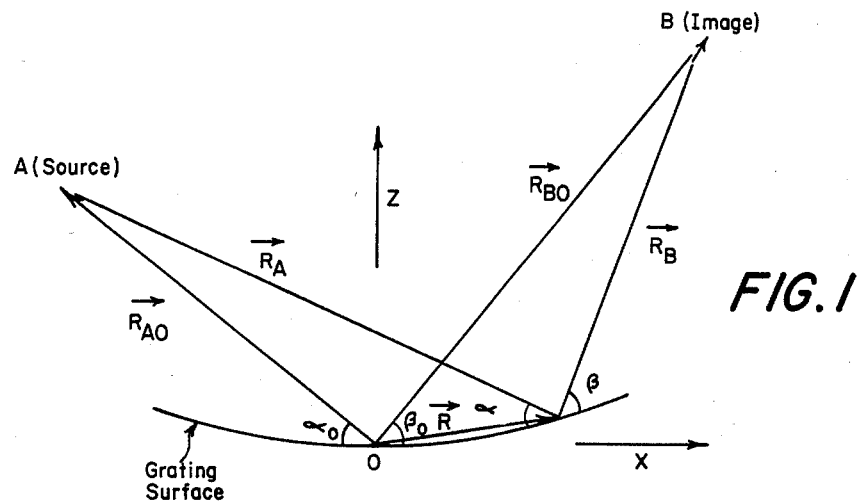
FIG. 1 is a schematic of the grating surface and its relation to the source (with position vector, $R_{A0}$) and diffraction image (with position vector, $R_{B0}$). $R_A$ and $R_B$ are position vectors of the source and image, respectively as viewed from the ray impact position with the grating surface, $\overline{R}$. The angles $\alpha$ and $\beta$ are the angles of incidence and diffraction, respectively, as measured with respect to the grating surface tangent.

Formally, the specification of the grating surface and grating line spacing along the surface which results in the maximum resolution over the wavelength range $\lambda_1$ to $\lambda_2$ can be expressed as the minimization of $$\rho^2 = \int_{\lambda_1}^{\lambda_2} (\sigma_\lambda/\lambda)^2 d\lambda \qquad (1)$$

with respect to all independent parameters specifying the grating surface and line spacing. The functional $(\sigma_\lambda/\lambda)^2$ is itself the result of a minimization since it is evaluated for each wavelength at the point along the diffracted central ray for which $\sigma_\beta^2$ is a minimum. Thus, the analytical determination of the grating surface and line spacing by a minimization of (1) is a prodigious task and will not be performed here. Rather, we approximate the desired surface with a polynomial $z = \Sigma a_k x^k$, specify the grating spacing at the origin and the source distance from the origin, and by ray tracing and taking numerical derivatives determine the minimum of $$\rho^2 = \int_{\lambda=\lambda_1}^{\lambda_2} \Sigma (\sigma_\lambda/\lambda)^2 \qquad (2)$$

with respect to all independent parameters. The optimum line spacing, which is ruled into the grating surface by well known techniques, can be determined from the surface description $z=z(x)$ and a wavelength and image distance for which the image spread is zero. For this purpose we again consider radiation from a line source incident upon a reflection grating as shown in FIG. 1. The radiation originates at A. Let the central ray of the radiation intersect the grating surface at the origin at an angle of incidence $\alpha_0$ with respect to the local tangent to the grating surface. If the wavelength of the incident radiation is $\lambda_0$, this central ray will diffract at an angle $\beta_0$ with respect to the local grating surface tangent. The relationship among $\lambda_0$, $\alpha_0$, and $\beta_0$ is just given by the diffraction condition $n\lambda_0/D_0 = \cos\alpha_0 - \cos\beta_0$ where $D_0$ is the grating line spacing near the origin and n is the order of diffraction.

Now, let the surface of the grating be a cylinder of cross section given by $$\vec{R} = x\hat{e}_x + z\hat{e}_z \qquad (3)$$

The points A and B (where B is the desired position of convergence of all diffracted radiation of wavelength $\lambda_0$) are specified by $$\vec{R}_{AO} = R_{AO}(-\cos\alpha_O \, \hat{e}_x + \sin\alpha_O \, \hat{e}_z) \qquad (4)$$
and
$$\vec{R}_{BO} = R_{BO}(\cos\beta_O \, \hat{e}_x + \sin\beta_O \, \hat{e}_z)$$

For any other ray from the source incident upon the grating surface at $\vec{R}$ and diffracted to B, the analogous position vectors are $$\vec{R}_A = \vec{R}_{AO} - \vec{R} = -(R_{AO}\cos\alpha_O + x)\hat{e}_x + (R_{AO}\sin\alpha_O - z)\hat{e}_z \qquad (5)$$
and
$$\vec{R}_B = \vec{R}_{BO} - \vec{R} = (R_{BO}\cos\beta_O - x)e_x + (R_{BO}\sin\beta_O - z)e_z$$

Since the tangent to the grating surface at R is proportional to $dR/dx$, $$\vec{R}_A \cdot d\vec{R}/dx = -R_A |d\vec{R}/dx| \cos\alpha \qquad (6)$$
and
$$\vec{R}_B \cdot d\vec{R}/dx = R_B |d\vec{R}/dx| \cos\beta$$

where $\alpha$ and $\beta$ are the local angles of incidence and diffraction, respectively. By making use of the diffraction condition $$n\lambda hd\, 0/D = \cos\alpha_0 - \cos\beta_0 \qquad (7)$$

the local line spacing, D, which will produce a stigmatic line image at B for the wavelength, $\lambda_0$ can be expressed as $$D = n\lambda_O |d\vec{R}/dx| \, [d/dx(R_A + R_B)]^{-1} \qquad (8)$$

Now, the path difference, $\beta = R_A + R_B - R_{A0} - R_{B0}$ between the central ray and any other ray can be written as $$\delta = \int_0^x d/dx\, (R_A + R_B)dx \qquad (9)$$

which, upon substition from (8), becomes $$\delta = n\lambda_0 \int_0^x D_x^{-1} dx = n\lambda_0 L \qquad (10)$$

where $D_x$ is the grating line spacing projected onto the x axis ($D = D_x |d\vec{R}/dx|$), and L is the number of lines between 0 and x. This expression shows that for the local line spacing given by (8), the path differences between rays of wavelength $\lambda_0$ diffracted to B are just integer multiples of the wavelength. Thus, the amplitudes of the rays diffracted to B add coherently and a line source is imaged to a line.

Consequently, the optimum line spacing, D (a function of x), can be determined from the following equation (refer to FIG. 1):

$$n(\lambda_O/D)[1 + (dz/dx)^2]^{1/2} = (d/dx)\{[(R_{AO}\sin\alpha_o - z)^2 + (R_{AO}\cos\alpha_o + x)^2]^{1/2} + (R_{Bo}\sin\beta_o - z)^2 + (R_{Bo}\cos\beta_o - x)^2]^{1/2}\} \qquad (11)$$

where
$z = $ function of x describes the surface of the substrate, d/dx denotes the derivative with respect to X, $\lambda_0$ is the wavelength at which the diffracted image is to be stigmatic, $R_{A0}$ and $R_{B0}$ are distances from the incident object and stigmatic image to the center of the grating, respectively, and $\lambda_0$ and $\beta_0$ are the incidence and diffraction angles, respectively, of the central ray with respect to the grating surface at its center for the wavelength $\lambda_0$.

Note that only the relationship (11) between the local grating line spacing and the local grating surface has been specified. Thus, if the grating surface is known, the optimum line spacing for a given wavelength can be determined. Note also that for zero order diffraction (n=0), $\delta=0$, which implies $R_A+R_B=R_{A0}+R_{B0}$, so the optimum surface is not the usual right circular cylinder but rather is a cylinder of elliptical cross section.

Optimization of the grating surface $z=z(x)$ and line spacing, D, for maximum wavelength resolution over the range $\lambda_1$ to $\lambda_2$ is, therefore, a well defined problem. We first specify the grating line spacing at the origin (i.e., for the central ray), the origin to source distance ($R_{A0}$), the angle of incidence at the origin ($\alpha$hd 0), and the radiation spray angle subtended by the grating. The remaining parameters, $\lambda_0$ (the optimum wavelength for line spacing determination), $R_{B0}$ (the distance from the origin to the image for $\lambda_0$), and the polynomial coefficients of $$z = \sum_{k=0}^{n} Q_k x^k,$$

can be determined from minimization of $\rho^2$ in expression (2). The surface on which the images are to be found is determined by finding that position for each wavelength at which the image blurring is a minimum.

In addition to the demands placed on gratings, high resolution spectroscopy places substantial limitations on both the entrance aperture and the detector spatial resolution. In order to obtain a resolving power P, the entrance aperture width, s, and the detector spatial resolution width, t, must satisfy $$s < (\lambda/D_O)(R_A/\sin\alpha_o) P^{-1} \quad (12)$$
$$t < (\lambda/D_O)(R_B/\sin\beta_o)(P \sin\beta_o)^{-1}$$

respectively, for this reflection grating spectrometer. Note, however, that if these conditions are only marginally satisfied, the resolution of the spectrometer system (aperture, grating and detector) will be diminished by a factor of 2-3.

Figure 2:
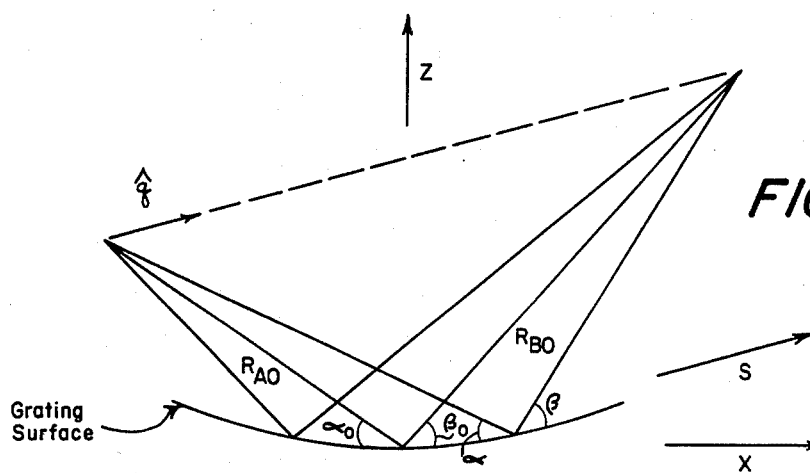
FIG. 2 is a schematic of the grating surface and its relation to the point source and optimum image position for $\lambda_0$. The grating line spacing is a function of s which is a distance measured from the origin parallel to $\hat{q}$.

In general, a fixed grating spectrometer cannot produce a point image from a point source except at one wavelength. However, by making use of the optimum surface obtained for a line source for which we have a solution in the form of $z=\Sigma q_k x^k$ and the line spacing $D=D(x)$ from equation 11, we can produce an optimum grating surface and line spacing for a point source. The origin to image vector, $\vec{R}_{B0}$, and the origin to source vector $\vec{R}_{A0}$ are used to define a direction vector q as in FIG. 2. Then the optimum grating surface is formed by rotating $z=\Sigma q_k x^k$ about $\hat{q}$ so that the grating surface is semi-toroidal in shape. The optimum line spacing is just the line source solution given by 11 for $x=s\hat{e}_x\cdot\hat{q}$ where s is measured with respect to the origin along a vector parallel to $\hat{q}$ passing through the origin.

Such a grating produces a point image at $\vec{R}_{B0}$ but all other images are arcs of circles whose radii are given by $$r=(R_B/\sin\beta_c)\sin(\alpha hd\ 0+\beta_c)\sin(|\beta c-\beta_0|) \quad (13)$$

and whose extent perpendicular to the image plane is $$2w=2r\sin\phi\sin\beta_0 \quad (14)$$

where $\phi$ is one half the spray angle of the source subtended by the width of the grating. Thus, in order to obtain the high resolution of the line source case, a two dimensional detector having a surface formed by rotating the image surface of the line source case about $\hat{q}$ is also needed. In most cases, however, the detector need have only modest spatial resolution perpendicular to the image plane in order to obtain high spectral resolution.

Figure 3:
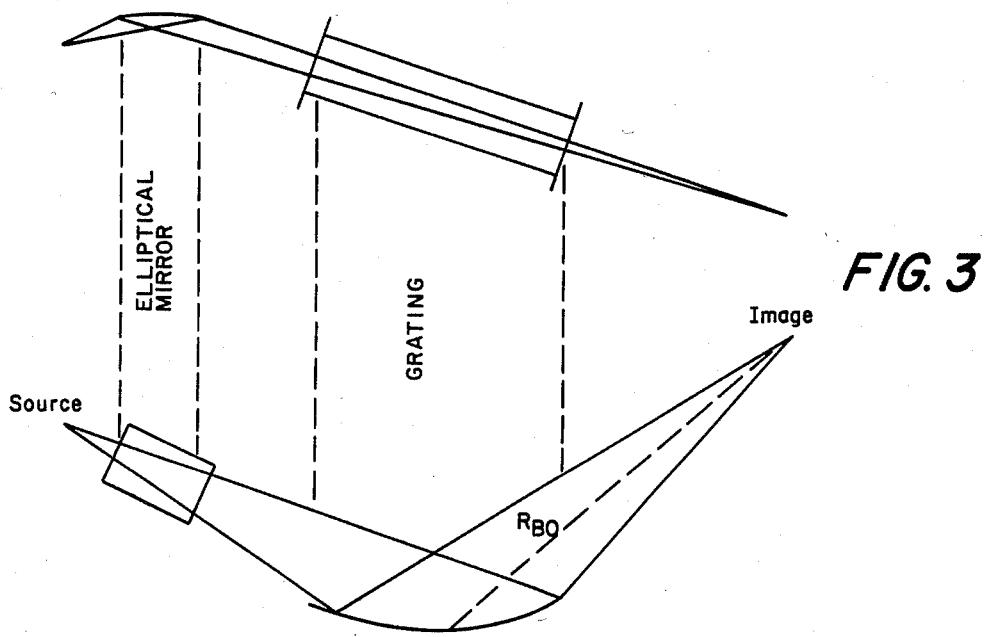
FIG. 3 is a schematic of the elliptical mirror-cylindrical grating system. The radiation from the point source is first reflected by the mirror to a point $R_{B0}$ behind the grating. The grating then diffracts the radiation and for $\lambda=\lambda_0$ a point image is formed at $R_{B0}$.

It is also possible to obtain high resolution using the line source optimum cylindrical grating if the point source is first imaged to a line in the image plane a distance $R_{B0}$ behind the grating. Here, this is accomplished with a cylindrical mirror of elliptical cross section oriented so that the axis of the mirror cylinder is perpendicular to the axis of the grating cylinder as in FIG. 3. That is, the mirror and grating are oriented just as Kirkpatrick-Baez mirrors are oriented (P. Kirkpatrick and A. V. Baez, J. Opt. Soc. Am 38, 766 (1948)) and for $\lambda_0$ diffracted to $R_{B0}$ have similar imaging qualities for a point source at a finite distance. The length of the ellipse major axis is $R_{A0}+R_{B0}$. Again, a point image is obtained at $R_{B0}$ for the wavelength $\lambda_0$. In this case, the images are lines perpendicular to the image plane and whose extent is given by $$2w=2d|R_B-R_{B0}|\tan\phi/(R_{A0}+R_{B0}-d) \quad (15)$$

where d is the source to eliptical mirror distance. The advantage of this system over the previous point source case is that high resolution is obtained without resorting to a two dimensional detector and a grating surface of revolution but one additional reflection is needed. All of the polynomial gratings described above are a direct substitute for gratings of traditional shape and are used in the same manner.

One alternate form of the grating surface is to let the grating shape be defined by a polynomial in each of the independent coordinates, i.e. z=function of x and y $z=\Sigma a_{ij}x^iy^j$ for the case of a point source.

While in the discussion presented the technique was applied to fixed reflection gratings in the standard Rowland geometry, other geometries (e.g., objective grating spectrometers and scanning spectrometers) can be similarly treated. Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for decomposing far ultraviolet and soft X-ray radiation into its component wavelengths at a wavelength resolution of greater than 1,000 for wavelengths in the wavelength range between $\lambda_1$ and $\lambda_2$ comprising: a diffraction grating having a diffraction grating surface defined by a polynomial $$Z = \sum_{k=0}^{n} Q_k X^k,$$

where k is an index going from 0 to the maximum order of the polynomial, and a represents the coefficients of the polynomial; and an optimum line spacing D determined by the equation $$n(\lambda_o/D)[1 + (dZ/dx)^2]^{\frac{1}{2}} = d/dx\{[(R_{AO}\sin\alpha_o - Z)^2 + (R_{AO}\cos\alpha_o + X)^2]^{\frac{1}{2}} + [(R_{BO}\sin\beta_o - Z)^2 + (R_{BO}\cos\beta_o - \chi)^2]^{\frac{1}{2}}\}$$

wherein the polynomial coefficients of $$Z = \sum_{k=0}^{n} Q_k X^k$$

are determined by minimization of $$\rho^2 = \sum_{\lambda=\lambda_1}^{\lambda_2} (\sigma\lambda/\lambda)^2$$

where $\lambda_1$ and $\lambda_2$ define the lowest and highest wavelength, respectively, in the wavelength range to be analyzed, $\rho$ is the measure of resolution as defined by the equation, and $\sigma\lambda$ is the root-mean-square deviation about the mean for $\lambda$; and where d/dx denotes the derivative with respect to x, $\lambda_0$ is the wavelength at which a diffracted image is to be stigmatic, $R_{A0}$ and $R_{B0}$ are distances from an incident object and the stigmatic image to the center of the grating respectively, $\alpha_0$ and $\beta_0$ are the incidence and diffraction angles, respectively, of a central ray with respect to the grating surface at its center for the wavelength $\lambda_0$, and Z is a function of X, as determined in the polynomial and in the equation for determining the optimum line spacing D.

2. An apparatus as described in claim 1 wherein the polynomial has coefficients $a_0 = 0.0$ cm (fixed), $a_1 = -1.91112 \times 10^{-10}$, $a_2 = 9.95755 \times 10^{-3}$ cm$^{-1}$, $a_3 = -1.00766 \times 10^{-6}$ cm$^{-2}$, $a_4 = 3.33658 \times 10^{-6}$ cm$^{-3}$, $a_5 = -2.28002 \times 10^{-8}$ cm$^{-4}$, $a_6 = 1.03691 \times 10^{-9}$ cm$^{-5}$, $a_7 = -8.783 \times 10^{-11}$ cm$^{-6}$, $a_8 = 1.954 \times 10^{-12}$ cm$^7$, $a_9 = -2.934 \times 10^{-15}$ cm$^{-8}$ and $a_{10} = 5.756 \times 10^{-15}$ cm$^{-9}$; $\lambda_1 = 40$ A, $\lambda_2 = 340$ A, and $\lambda_0 = 193.498$ A, $R_{A0} = 17.365$ cm and $R_{B0} = 46.8926$ cm; and where $\alpha_0 = 10°$.

3. A method for decomposing far ultraviolet and soft X-ray radiation into its component wavelengths at a wavelength resolution of greater than 1000 for wavelengths in the wavelength range between $\lambda_1$ and $\lambda_2$, where $\lambda_1$ and $\lambda_2$ define the lowest and highest wavelength, respectively, in the wavelength range to be analyzed, comprising:

gathering ultraviolet and soft X-ray radiation;

focusing the gathered radiation into an entrance slit of a spectrometer;

diffracting the radiation that has passed through the entrance slit with a fixed polynomial diffraction grating that has a diffraction grating surface defined by a polynomial $$Z = \sum_{k=0}^{n} Q_k X^k,$$

where k is an index going from 0 to the maximum order of the polynomial, and $a_k$ represents the coefficients of the polynomial, and an optimum line spacing D determined by the equation $$n(\lambda_o/D)[1 + (dZ/dx)^2]^{\frac{1}{2}} = d/dx \{(R_{AO}\sin\alpha_o - Z)^2 + (R_{AO}\cos\alpha_o + X)^2]^{\frac{1}{2}} + [(R_{BO}\sin\beta_o - Z)^2 + (R_{BO}\cos\beta_o - X)^2]^{\frac{1}{2}}\}$$

wherein the polynomial coefficients of $$Z = \sum_{k=0}^{n} Q_k X^k$$

are determined by minimization of $$\rho^2 = \sum_{\lambda=\lambda_1}^{\lambda_2} (\sigma\lambda/\lambda)^2$$

where $\lambda_1$ and $\lambda_2$ define the lowest and highest wavelength, respectively, in the wavelength range to be analyzed, $\rho$ is the measure of resolution as defined by the equation, and $\sigma\lambda$ is the root-mean-square deviation about the mean for $\lambda$; and where d/dx denotes the derivative with respect to x, $\lambda_0$ is the wavelength at which a diffracted image is to be stigmatic, $R_{A0}$ and $R_{B0}$ are distances from an incident object and the stigmatic image to the center of the grating respectively, $\alpha_0$ and $\beta_0$ are the incidence and diffraction angels, respectively, of a central ray with respect to the grating surface at its center for the wavelength $\lambda_0$, and Z is a function of X, as determined in the polynomial, in the equation for determining the optimum line spacing D; focusing the diffracted radiation onto a detector array, the detector array being situated so that each position on the detector array upon which the diffracted radiation focuses, corresponds to a unique wavelength.

4. A spectrometer comprising;

an entrance means for allowing radiation to be analyzed to pass therethrough a diffracting grating means that is fixed relative to the entrance means and which resolves at a power greater than $10^3$ all the wavelengths in the wavelength range between $\lambda_1$ and $\lambda_2$, where $\lambda_1$ is 40 A and $\lambda_2$ is 340 A, and are the lowest and highest wavelengths in the range to be analyzed, and a detector array means for detecting the component wavelengths of the defracted radiation, the diffracting grating located so that radiation passing through the entrance means is diffracted by the diffraction grating onto the detector array means.

* * * * *